(12) United States Patent
Li et al.

(10) Patent No.: US 8,621,342 B2
(45) Date of Patent: Dec. 31, 2013

(54) SYSTEM AND METHOD FOR XML REGISTRY RE-PARSING

(75) Inventors: Lang Li, Beijing (CN); Charles Paclat, Medford, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1147 days.

(21) Appl. No.: 12/557,402

(22) Filed: Sep. 10, 2009

(65) Prior Publication Data

US 2011/0029857 A1    Feb. 3, 2011

Related U.S. Application Data

(60) Provisional application No. 61/230,036, filed on Jul. 30, 2009.

(51) Int. Cl.
 *G06G 7/00* (2006.01)
(52) U.S. Cl.
 USPC ........................... 715/237; 715/234; 715/236
(58) Field of Classification Search
 USPC .................................. 715/200, 234, 236, 237
 See application file for complete search history.

(56) References Cited

U.S. PATENT DOCUMENTS

| | | | | |
|---|---|---|---|---|
| 5,761,631 A * | 6/1998 | Nasukawa | ........................ | 704/9 |
| 6,421,733 B1 * | 7/2002 | Tso et al. | ....................... | 709/246 |
| 6,934,740 B1 * | 8/2005 | Lawande et al. | .............. | 709/213 |
| 7,610,630 B2 * | 10/2009 | Ji et al. | ............................ | 726/29 |
| 7,644,361 B2 * | 1/2010 | Wu et al. | ........................ | 715/273 |
| 7,650,597 B2 * | 1/2010 | Bohlmann et al. | ............. | 717/136 |
| 7,860,964 B2 * | 12/2010 | Brady et al. | .................... | 709/223 |
| 2002/0010741 A1 * | 1/2002 | Stewart et al. | ................. | 709/204 |
| 2004/0117333 A1 * | 6/2004 | Voudouris et al. | .............. | 706/13 |
| 2004/0254919 A1 * | 12/2004 | Giuseppini | ........................ | 707/3 |
| 2005/0257170 A1 * | 11/2005 | Kim et al. | ....................... | 715/825 |
| 2006/0168569 A1 * | 7/2006 | Smith et al. | .................... | 717/124 |
| 2009/0132910 A1 * | 5/2009 | Cseri et al. | ..................... | 715/234 |

* cited by examiner

*Primary Examiner* — Stephen Hong
*Assistant Examiner* — Gregory J Vaughn
(74) *Attorney, Agent, or Firm* — Fliesler Meyer LLP

(57) ABSTRACT

A system and method can provide a re-parsing mechanism that is plugged into a delegation layer that is transparent to the XML applications. The re-parsing mechanism can perform one or more XML parsing operations based on a local document type definition or schema file. If an error is detected during one or more XML parsing operations based on the local document type definition or schema file, the re-parsing mechanism allows for retrieving an updated document type definition or schema file from a remote application server and performing the one or more XML parsing operations again based on the updated document type definition or schema file.

20 Claims, 3 Drawing Sheets

```
1   Get DTD/XSD A from cache
2   Parse XML document using DTD/XSD A
3   If catch parsing error then {
4       Get DTD/XSD B again from cache
5       If both DTD/XSD A and B are equal then {
6           Synchronized (DTD/XSD A's identity) {
7               // only one thread can run into this block
8               Get DTD/XSD B again from cache
9               If both DTD/XSD A and B are equal then {
10                  // double check
11                  Retrieve the new DTD/XSD from remote server
12                  and put it into the local cache and assign
13                  the new DTD/XSD object value to variable B
14              }
15          }
16      }
17      If both DTD/XSD A and B are not equal then {
18          Re-parse using DTD/XSD B if needed
19      }
20  }
```

Figure 3

SYSTEM AND METHOD FOR XML REGISTRY RE-PARSING

CLAIM OF PRIORITY

This application claims priority from the following application, which is hereby incorporated by reference in its entirety:

U.S. Provisional Application No. 61/230,036, entitled SYSTEM AND METHOD FOR XML REGISTRY RE-PARSING MECHANISM, filed on Jul. 30, 2009.

FIELD OF INVENTION

The present invention relates to the field of configuring an application server for use with XML applications.

BACKGROUND

Extensible Markup Language (XML) is a markup language used to describe the content and structure of data in a document. It is a simplified version of Standard Generalized Markup Language (SGML). XML is an industry standard for delivering content on the Internet. Because it provides a facility to define new tags, XML is also extensible.

XML uses tags to describe content. However, rather than focusing on the presentation of content, the tags in XML describe the meaning and hierarchical structure of data. This functionality allows for the sophisticated data types that are required for efficient data interchange between different programs and systems. Further, because XML enables separation of content and presentation, the content, or data, is portable across heterogeneous systems.

The XML syntax uses matching start and end tags (such as <name> and </name>) to mark up information. Information delimited by tags is called an element. Every XML document has a single root element, which is the top-level element that contains all the other elements. Elements that are contained by other elements are often referred to as sub-elements. An element can optionally have attributes, structured as name-value pairs, that are part of the element and are used to further define it.

SUMMARY

In accordance with an embodiment, a re-parsing mechanism can be plugged into a delegation layer that is transparent to the XML applications. The re-parsing mechanism can perform one or more XML parsing operations based on a local document type definition or schema file. If an error is detected during one or more XML parsing operations, based on the local document type definition or schema file, the re-parsing mechanism allows for retrieving an updated document type definition or schema file from a remote application server and performing the one or more XML parsing operations again based on the updated document type definition or schema file.

BRIEF DESCRIPTION OF THE FIGURES

FIG. 3 is an exemplary implementation of the re-parsing mechanism in a multithread environment in accordance with an embodiment.

DETAILED DESCRIPTION

Figure 1:
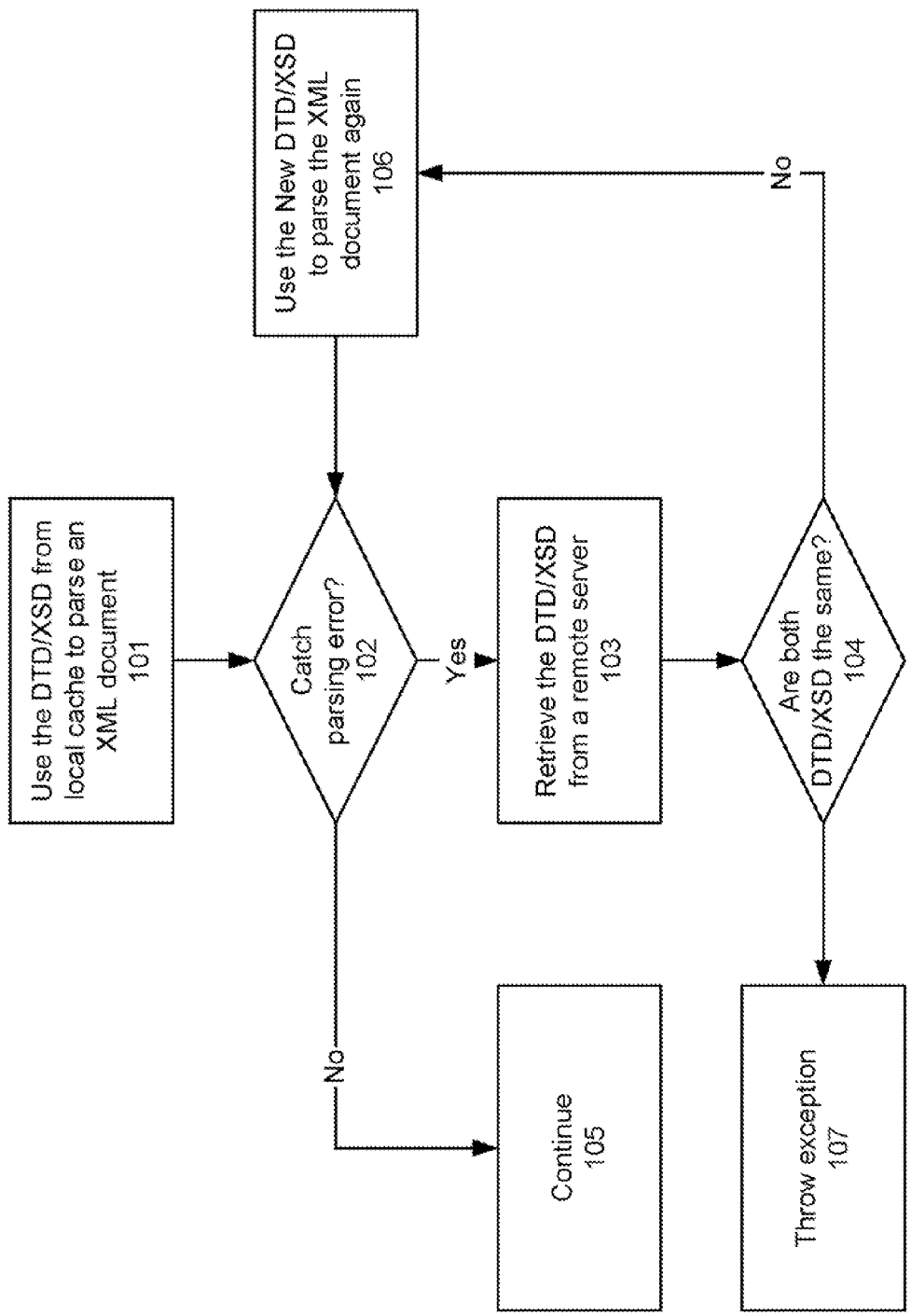
FIG. 1 is an exemplary illustration that shows a sequence of actions to support the re-parsing mechanism in accordance with an embodiment.

The present invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the embodiments of the invention as following uses WebLogic® application server functions or libraries as an example for application server functions or libraries. It will be apparent to those skilled in the art that other types of application server functions or libraries can be used without limitation.

XML Registry

In accordance with an embodiment, programmers can use an XML system, such as the WebLogic Server® XML subsystem, to develop XML applications.

XML documents can originate from a number of sources. For example, a programmer can develop a servlet to receive an XML document from a client, write an Enterprise Java®0 Bean (EJB) to receive an XML document from a servlet or another EJB, and so on. In each instance, the XML document can be parsed so that its data can be manipulated.

After a servlet or EJB is received and the XML document is parsed, the servlet or EJB can generate a new XML document based on manipulated data in the XML document. The servlet or EJB can send the new XML document back to the client, or pass it on to another EJB. Furthermore, after parsing an XML document or generating a new XML document, the servlet or EJB can transform the XML document into another format, such as HTML, WML, or plain text.

In accordance with an embodiment, an XML registry is a facility for configuring and administering the XML resources of an instance of an application server. XML resources in an application server include the parser used by an application to parse XML data, the transformer used by an application to transform XML data, external entity resolution, and caching of external entities. The XML registry can configure parsers and transformers, as well as external entity resolution.

In accordance with an embodiment, a configuration value or tab can be used to set utility classes for a particular XML registry, such as DocumentBuilderFactory, SaxParserFactory, and Transformer Factory classes. The default configuration value in an application server can be overridden by the XML registry to use cached external entities. In one example, the configuration tab includes two links: a first link to configure external entity resolution, and a second link to configure parsers for a particular document type.

In accordance with an embodiment, the XML registry can be configured either through configuration in a console, or a config.xml file. Using the XML registry administration console presents several benefits. For example, changes to the configuration of the XML registry can take effect automatically at run time, when Java® API for XML Processing (JAXP) is used in XML applications. Also, when changes are made to the XML registry, the XML application code can remain unchanged, while entity resolution can be performed locally. In addition, the XML registry can be used either to define a local copy of an entity or to specify, at an application server cache, an entity from the Web for a specified duration and use the cached copy rather than the one out on the Web.

In accordance with an embodiment, an XML registry can be used to specify an alternative server-wide XML parser, instead of the built-in parser; an XML parser per document type; and an alternative server-wide transformer, instead of the built-in transformer. In addition, the XML Registry can be used to specify external entities that are resolved by using local copies of the entities. Once these entities are specified, the application server stores local copies of them in the file system and automatically distributes them to the server's parser at parsing time. This can eliminate the need to construct and set external entities, such as Simple API for XML (SAX) entity resolvers.

Also, external entities can be cached by an application server after they have been retrieved from the Web. The XML registry can be used to specify how long these external entities can be cached before the application server re-retrieves them and when the application server can first retrieve the entities, either at application run time or when an application server starts.

In accordance with an embodiment, only one XML Registry is associated with a particular instance of application server, even though multiple XML Registries can be created and made available as necessary. If an instance of application server does not have an XML Registry associated with it, then the built-in parser and transformer can be used when parsing or transforming documents.

In accordance with an embodiment, once an XML registry is associated with an instance of application server, all XML configuration options are available for XML applications in the application server. The XML registry is automatically consulted whenever JAXP is used to write XML applications. The application server can determine which parser class to load based on a pre-defined sequence, such as the following:

Use the parser defined for a particular document type.
Use the alternative server-wide parser defined in the XML Registry associated with the application server instance.
Use the built-in Xerces parser.

In accordance with an embodiment, the process can also generally be true for transformers, except that a transformer needs to be defined for a particular document type. Additionally, when an application server starts, an entity resolver is automatically set so that it can resolve entities that are declared in the registry. As a result, users are not required to modify their XML application code to control the parsers used, or to set the location of local copies of external entities. The location of the external entity is controlled by the XML registry.

XML Registry Parser

In accordance with an embodiment, the XML Registry Parser uses a document type definition (DTD) file or a schema (XSD) file from a local cache to parse XML documents instead of retrieving the DTD file or the schema XSD file from the remote server each time the document is parsed. If the DTD/XSD file is changed on the remote server, the parser may not be able to use the newest DTD/XSD because the parser is not aware of the change to the DTD/XSD on the remote server. This can cause the parsing operation to fail and requires special logic in an application code to catch the error and reparse the XML documents.

In accordance with an embodiment, a flexible parser can use the newest DTD/XSD. The XML registry parser can wrap a JAXP parser (either a Document Builder or a SAX Parser) using a delegation layer, and delegate all parsing operations to an underlying JAXP parser. A re-parsing mechanism can be plugged into the delegation layer. The delegation layer with the re-parsing mechanism is transparent to applications which have no knowledge of the existence of the re-parsing mechanism. Without limitation, the re-parsing mechanism can be a piece of software code or logic that is implemented to perform the steps as described in the following sections.

In one example, WebLogic Server® can provide an implementation of these APIs in the form of the classes:
weblogic.xml.jaxp.RegistryDocumentBuilder
weblogic.xml.jaxp.RegistryParser
weblogic.xml.jaxp.RegistryXMLReader
weblogic.xml.registry.RegistryEntityResolver FIG. 1 is an exemplary illustration that shows a sequence of actions to support the re-parsing mechanism in accordance with an embodiment. As shown in FIG. 1, a parser can use a document type definition (DTD) file or a schema (XSD) file from a local cache on an application server to parse an XML document at step 101. If the parsing is successful at step 102, i.e. no errors are detected, then the application can continue to process the XML document at step 105. Otherwise, if the parsing fails at step 102, then a new DTD/XSD is retrieved from a remote server at step 103. At step 104, the new DTD/XSD is compared with the old DTD/XSD to see whether they are the same, or whether there is a recent update on the DTD/XSD. If an update DTD/XSD is identified, the new DTD/XSD is used to parse the XML document again at step 106; otherwise, at step 107 an exception can be thrown to indicate that there is a failure in parsing the XML document, since, at this point it can be determined that both the DTD/XSD in local cache and the DTD/XSD from the remote server are the same, and that no update on the DTD/XSD is identified.

In accordance with an embodiment, various methods, such as bit-by-bit comparison, can be used to compare the new DTD/XSD with the old DTD/XSD.

Figure 2:
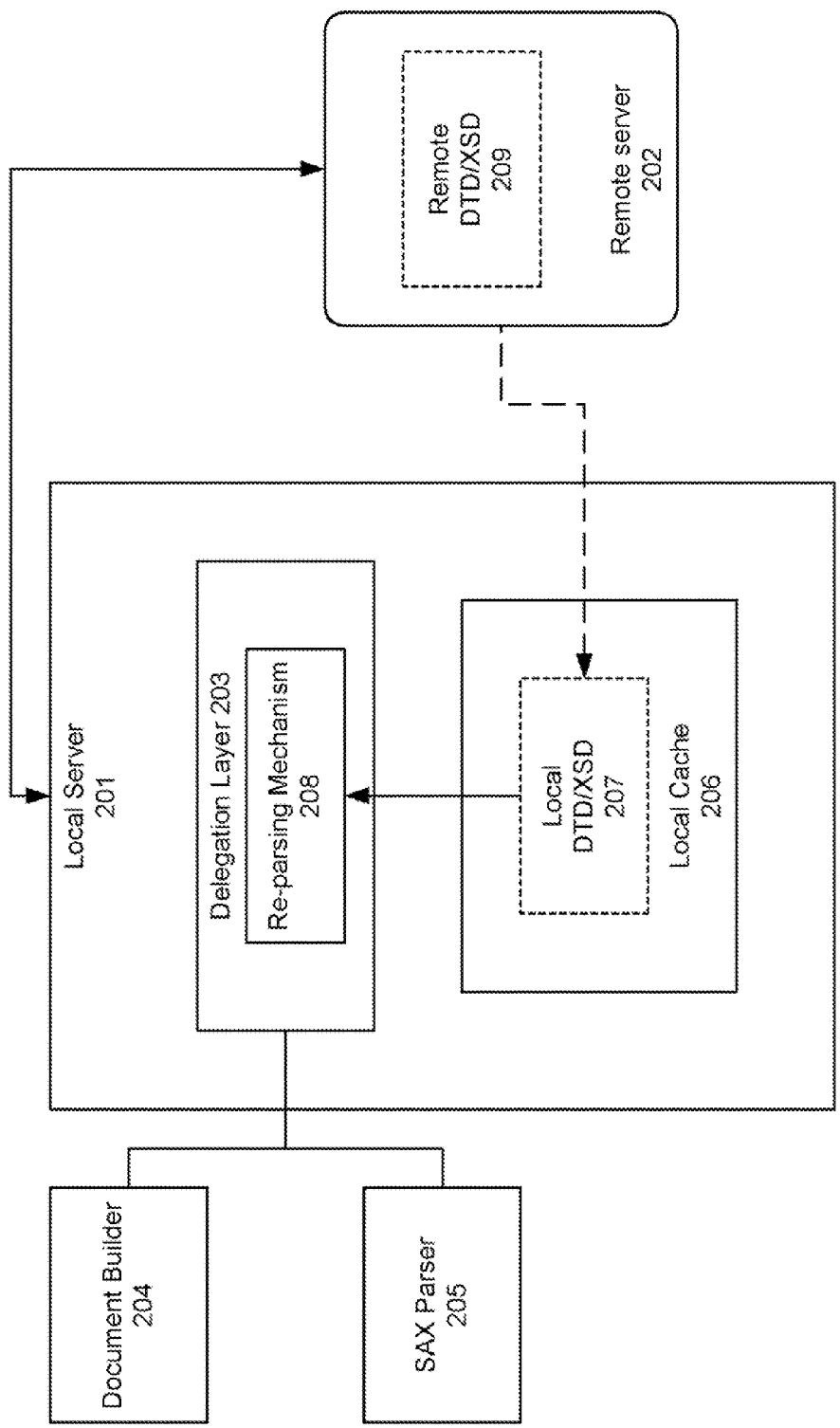
FIG. 2 is an exemplary illustration that shows the architecture of a system for supporting the re-parsing mechanism in accordance with an embodiment.

FIG. 2 is an exemplary illustration that shows the architecture of a system for supporting the re-parsing mechanism in accordance with an embodiment. As shown in FIG. 2, a delegation layer 203 is provided on an application server 201 where the delegation layer is transparent to the XML applications, wherein at least one of the XML applications invokes one or more XML parsing operations, and wherein the delegation layer delegates the one or more XML parsing operations to one of a plurality of parsers 204 or 205 that are associated with the delegation layer. A re-parsing mechanism 208 or logic is plugged into or included in the delegation layer 203 to perform the different steps of: retrieving a local copy of a document type definition (DTD) file or a schema (XSD) file 207 from a local cache 206 of the application server 201; performing the one or more XML parsing operations based on the local DTD/XSD 207; retrieving an updated copy of the document type definition (DTD) file or the schema (XSD) file 209 from a remote application server 202, if an error is caught during the one or more XML parsing operations based on the local DTD/XSD 207; and executing the one or more XML parsing operations again based on the updated DTD/XSD 209.

Multithread Environment

In accordance with an embodiment, multiple threads can be prevented from concurrently refreshing the cache at once. FIG. 3 is an exemplary implementation of the re-parsing mechanism in a multithread environment in accordance with an embodiment. As shown in the pseudo code in FIG. 3, at lines 6-15 only one thread can refresh the document type definition (DTD) file or the schema (XSD) file in the local cache at one time. As shown at line 17-19, the XML document is re-parsed only if an update on the DTD/XSD is confirmed.

In accordance with an embodiment, a parsing process can fire or communicate various parsing events such as: an error event, a content event, a document event, and/or a DTD event.

These parsing events can be handled by a related handler. In one example, error events are registered to be handled by either a document builder or a SAX parser; while other parsing events, such as the content event, the document event, and the DTD event, are registered to be handled by only a SAX parser. Additional types of parsing events can be handled by extended SAX2 handlers, such as by a lexical handler, or a declaration handler.

In accordance with an embodiment, the re-parsing mechanism can repeat multiple parsing processes, but only the last parsing process fires those events because the mechanism is transparent to customer applications that use handler-to-handle parsing events.

In accordance with an embodiment, the public interface can be accessed through the XML registry. A default interface can be configured for all entities by setting an attribute on the XML registry, or for each individual entity by setting an attribute at the XML entity specification registration entry.

In accordance with another embodiment, there can be two drivers which run concurrently for testing the re-parsing mechanism. One driver runs the primary test case that parses XML documents repeatedly, while another driver can intermittently change XML documents and related DTD/XSDs in synchronization. In addition, each process can be multi-threaded.

The above test case can test the re-parsing functionality, concurrent refreshing control and even parsing event handlers.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method to configure an application server for XML applications, comprising:
   providing a delegation layer on an application server that is transparent to the XML applications, wherein at least one of the XML applications invokes one or more XML parsing operations;
   retrieving a local copy of a document type definition (DTD) file or a schema (XSD) file from a local cache of the application server;
   performing the one or more XML parsing operations based on the local copy;
   retrieving an updated copy of the DTD file or the XSD file from a remote application server if an error is detected during the one or more XML parsing operations based on the local copy; and
   performing the one or more XML parsing operations again based on the updated copy.

2. The method according to claim 1, further comprising:
   delegating the one or more XML parsing operations to one of a plurality of parsers that are associated with the delegation layer.

3. The method according to claim 1, further comprising:
   refreshing the local copy in the local cache with the updated copy before performing the one or more XML parsing operations.

4. The method according to claim 3, further comprising:
   preventing multiple threads from concurrently refreshing the local document type definition or schema file in the local cache.

5. The method according to claim 1, further comprising:
   firing one or more parsing events including at least one of: an error event, a content event, a document event, a DTD event, or other parsing event handled by an extended handler.

6. The method according to claim 5, further comprising:
   handling the one or more parsing events using one or more parsing event handler that is associated with a parser.

7. The method according to claim 1, further comprising:
   repeating multiple parsing processes.

8. The method according to claim 7, wherein:
   only the last parsing processes can fire one or more parsing events.

9. The method according to claim 1, further comprising:
   testing a re-parsing mechanism using two drivers that are running concurrently, wherein one driver parses XML documents repeatedly while the another driver intermittently changes the XML documents and related document type definition or schema file in synchronization.

10. The method according to claim 9, wherein:
    each of the two drivers is multithreaded.

11. A system to configure an application server for XML applications, comprising:
    a delegation layer on an application server that is transparent to the XML applications, wherein at least one of the XML applications invokes one or more XML parsing operations, and wherein the delegation layer delegates the one or more XML parsing operations to one of a plurality of parsers that are associated with the delegation layer; and
    a re-parsing mechanism that is plugged into the delegation layer, and the re-parsing mechanism to perform,
    retrieving a local copy of a document type definition (DTD) file or a schema (XSD) file from a local cache of the application server;
    performing the one or more XML parsing operations based on the local copy;

retrieving an updated copy of the document type definition (DTD) file or the schema (XSD) file from a remote application server, if an error is detected during the one or more XML parsing operations based on the local copy; and performing the one or more XML parsing operations again based on the updated copy.

12. The system according to claim 11, wherein:
the re-parsing mechanism can further perform refreshing the local document type definition or schema file in the local cache with the updated document type definition or schema file, before performing the one or more XML parsing operations.

13. The system according to claim 12, wherein:
the re-parsing mechanism can further perform preventing multiple threads from concurrently refreshing the local document type definition or schema file in the local cache.

14. The system according to claim 11, wherein:
the re-parsing mechanism can further perform firing one or more parsing events including at least one of: an error event, a content event, a document event, a DTD event, or other parsing event handled by an extended handler.

15. The system according to claim 14, wherein:
the re-parsing mechanism can further perform handling the one or more parsing events using one or more parsing event handler that is associated with a parser.

16. The system according to claim 11, wherein:
the re-parsing mechanism can further perform repeating multiple parsing processes.

17. The system according to claim 16, wherein:
only the last parsing processes can fire one or more parsing events.

18. The system according to claim 11, further comprising:
two drivers to test a re-parsing mechanism, wherein the two drivers are running concurrently, wherein one driver parses XML documents repeatedly while another driver intermittently changes the XML documents and related document type definition or schema file in synchronization.

19. The system according to claim 18, wherein:
each of the two drivers is multithreaded.

20. A non-transitory machine readable medium having instructions stored thereon that when executed cause a system to:
provide a delegation layer on an application server that is transparent to the XML applications, wherein at least one of the XML applications invokes one or more XML parsing operations;

retrieve a local copy of a document type definition (DTD) file or a schema (XSD) file from a local cache of the application server;

perform the one or more XML parsing operations based on the local copy;

retrieve an updated copy of the DTD file or the XSD file from a remote application server, if an error is detected caught during the one or more XML parsing operations based on the local copy; and perform the one or more XML parsing operations again based on the updated copy.

* * * * *

UNITED STATES PATENT AND TRADEMARK OFFICE
CERTIFICATE OF CORRECTION

PATENT NO.         : 8,621,342 B2                                          Page 1 of 1
APPLICATION NO.    : 12/557402
DATED              : December 31, 2013
INVENTOR(S)        : Li et al.

It is certified that error appears in the above-identified patent and that said Letters Patent is hereby corrected as shown below:

In the Specification

In column 2, line 26, delete "Java®0" and insert -- Java® --, therefor.

Signed and Sealed this
Sixteenth Day of September, 2014

Michelle K. Lee
*Deputy Director of the United States Patent and Trademark Office*